UNITED STATES PATENT OFFICE

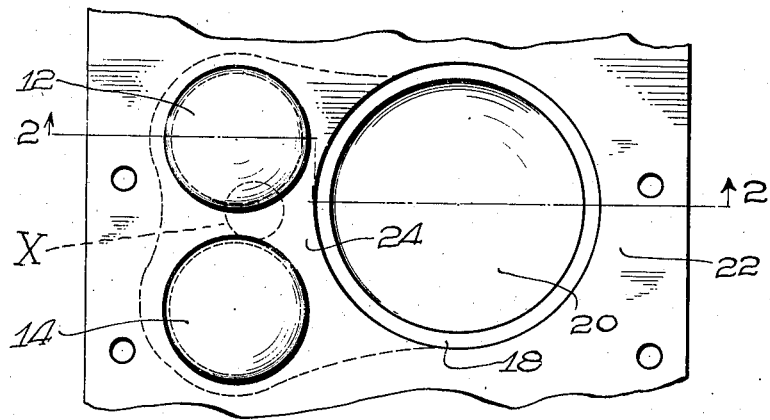
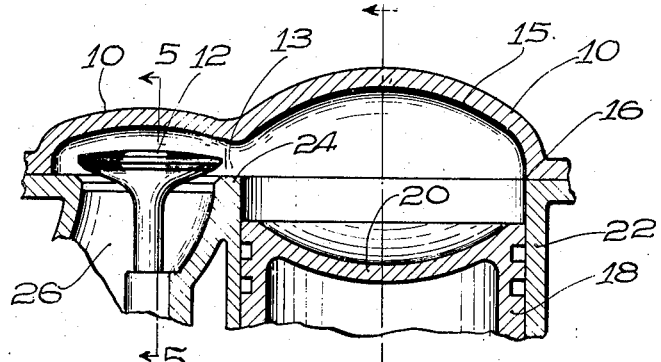
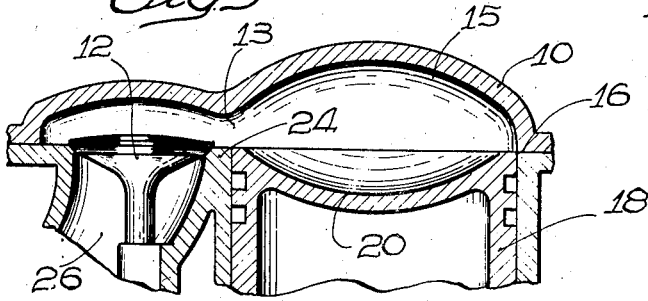

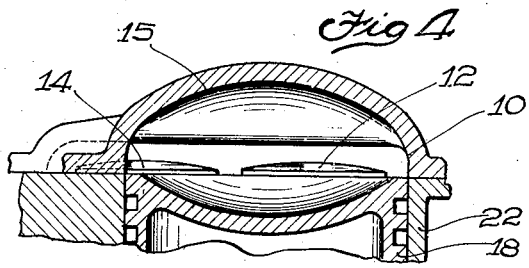
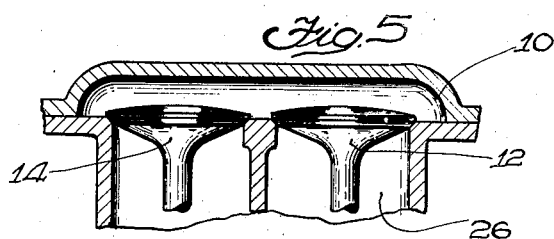
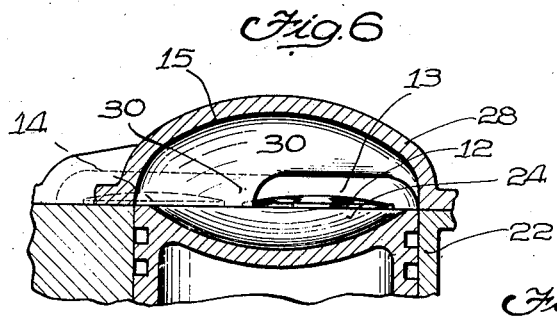
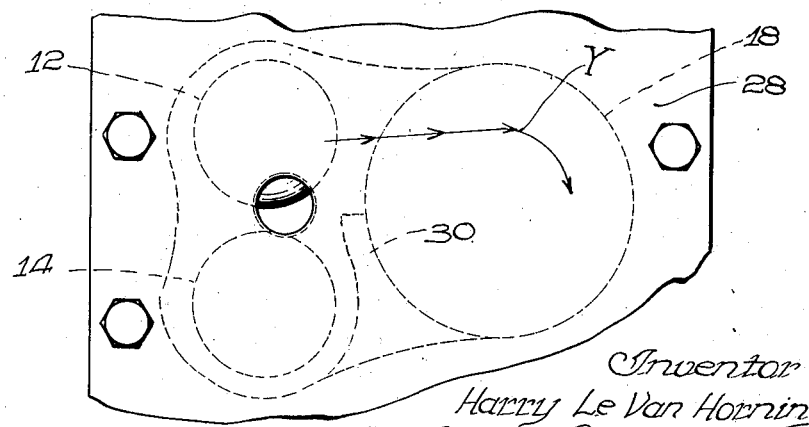

HARRY LE VAN HORNING, OF WAUKESHA, WISCONSIN, ASSIGNOR TO WAUKESHA MOTOR COMPANY, OF WAUKESHA, WISCONSIN, A CORPORATION OF WISCONSIN

INTERNAL-COMBUSTION ENGINE

Application filed April 18, 1921, Serial No. 462,187. Renewed January 26, 1928.

My invention relates to internal combustion engines, and is concerned with the configuration of the combustion chamber with which the combustible gases come into contact, for the purpose of promoting turbulence which, in turn, I employ as an artifice to hurry the complete contact of the combining elements for the purposes of rapid combustion.

In contra distinction to the process starting at one point and progressing successively to the extreme ends, leaving the various contents in various stages of combustion throughout the mixture, turbulence effects a homogeneous process of combustion throughout the whole mixture, so that the various stages of combustion in one unit section at any part of the chamber are somewhat simultaneous with the same processes occurring at any other.

The speed of any chemical reaction is a direct function of the rate at which the molecules of the re-agents are brought into contact with each other, and the speed of combustion is one of the essential factors determining thermal efficiency and power, because the efficiency of the cycle is determined by the exactness with which a larger part of the heat is given to the working fluid at constant volume. The turbulence of the mixture at the time of ignition may be likened to an usher in a theatre just before the curtain rises. It facilitates the process whereby all the elements involved finally get into their places in time.

Another important advantage of turbulence is its action on the gas adjacent the surfaces of the combustion chamber. In any chamber, there is a layer of gas of definite thickness adjacent the surfaces defining the chamber. This gas must be driven into the flame or it will remain unburned. The active gas driven into the flame contributes to the final high temperatures and pressures produced by the combustion, resulting in improvement in both thermal efficiency and power. Likewise, the flame having progressed along will have certain products of combustion therein, which are not important in the flame, and the ideal would be to replace the stagnant layer of active gas on the combustion chamber wall with the burned gas. If the combustion chamber has a large ratio of area to volume, the proportion of gas withheld from combustion, in the surface layer is correspondingly increased. This may be minimized somewhat by reducing the ratio of area to volume in the combustion chamber, but to an even greater extent, by producing turbulence.

Another important advantage of turbulence is that the products of combustion are more evenly distributed throughout the mass to act as diluents and retard the later phases of combustion.

Many other advantages of my invention may become apparent subsequently, those enumerated above being illustrative of some of the more important advantages at present known to me. The above advantages are believed to be applicable to all types of fuel, including fuels which are easily gasified and whose chemical structure is such as to prevent too rapid combustion at the temperatures and pressures common in internal combustion engines, which fuels might be termed "ideal" fuels for internal combustion engine work.

Another advantage also generally applicable, but of special importance in a case of a fuel that is relatively unstable, chemically speaking, or has a low temperature of auto-ignition, is the tendency to prevent excessive pre-heating of any portion of the mixture. Certain points in the combustion chamber are necessarily hotter than others. In ordinary operation, the sparking points, the exhaust valve and the center of the upper surface of the piston are usually the hottest portions of the combustion chamber in the order named. The mixture over the high temperature parts is immune from auto-ignition, detonation or pre-ignition in proportion to the turbulence of the mixture. Turbulence, therefore, is an effective means in limiting or entirely preventing the various objectionable phenomena associated with pre-ignition, detonation, auto-ignition, and other forms of too rapid combustion.

Under certain circumstances the superposition of sound waves passing through the mixture, on the compression wave caused by combustion may result in detonation. In a combustion chamber having flat surfaces, sound waves can echo and re-echo from side to side, increasing many fold the likelihood of such encounters as will result in detonation. The form of combustion chamber I employ is such as to damp out the sound waves produced at the moment of ignition, and any other compression waves that may be set up by the process of combustion.

For the purpose of further illustrating my invention so that others skilled in the art will be able to practice the same, I have herein illustrated and described exemplary ways of applying the principles of my invention to the process of combustion in an L-head motor. It should, however, be borne in mind that my invention is not limited in its broader aspects to any one of the various types of cylinders at present well known or hereafter to be developed.

In the accompanying drawings,

Figure 1 is a fragmentary plan view showing one cylinder of an internal combustion engine and the inlet and exhaust valves associated therewith;

Figure 2 is a vertical section through the parts indicated in Figure 1 substantially on the line 2—2; and Figure 3 is a similar section showing a different position of the parts;

Figures 4 and 5 are sections on the lines 4—4 and 5—5 respectively of Figure 2;

Figure 6 is a section similar to Figure 4, showing a modified form; and

Figure 7 is a fragmentary plan view of the same.

In the embodiment of my invention selected for illustration, the cylinder head 10 is spaced above the inlet valve 12 and the exhaust valve 14 only enough to provide a satisfactory clearance for the operation of the valve, and is bent downwardly to define a passage 13 through which the incoming gases enter the cylinder proper. The portion directly over the piston is dome-shaped, having substantially the gentle curvature indicated at 15 in Fig. 2, which curvature merges into the vertical wall of the cylinder at 16. The upper surface of the piston 18 is curved to cooperate with the surface 15 to define at substantially all positions of the piston an enclosed space of relatively small area compared with its volume, and as far as possible devoid of corners or sharp irregularities of contour with reference to the general path of the turbulent mixture. The upper edge of the cylinder 22 forms a lip 24 cooperating with the cover 10 to define passage 13. The spark plug may be located at any suitable or preferred point, the location at present considered most desirable being indicated in dotted lines at X in Fig. 1.

While it is far from easy to observe the phenomena occurring inside an internal combustion engine, during operation of the same, I believe that the operation and functioning of the parts illustrated is substantially as follows:—

At the beginning of the suction stroke, the inlet valve 12 is raised as shown in Fig. 2 and as the piston starts down the mixture will flow from the inlet passage 26 around the valve and through passage 13 into the space above the cylinder. The downward movement of the piston leaves a pocket or dead space just below lip 24, past which pocket the incoming mixture is projected through passage 13 tending to pass across to the far side of the cylinder and there being deflected downwardly by the gently curved surface 15. The cooperating surface 20 will receive this stream and direct it back into the pocket adjacent lip 24, filling this pocket, which as the piston descends further merges into the body of the space receiving the mixture. As intended, a swirl or vortex is thus developed which fills the entire cylinder with a mass of gas circulating in a general movement within the surfaces confining it.

It is the intent of this invention to preserve the turbulent movement of the gases throughout the compression stroke so as to have maximum gas velocities at the moment of ignition. At this time, the piston is in the position shown in Figure 3, and the upper surface of the piston is covered with the current of gaseous mixture moving rapidly in one direction, the lower surface of the cylinder head being covered with the same current returning rapidly in the opposite direction. At a point in the valve pocket in the path of the incoming intake gases relatively near this exhaust valve and near the orifice 13 the ignition should be set, as I have determined by experiment; but it will appear to those skilled in the art that my invention, as set forth in the broader of the appended claim, may be realized even though the ignition is not placed in this specific position. The gas over the exhaust valve is therefore ignited at the very beginning of combustion thus eliminating chances of later detonation or auto-ignition. The relatively stagnant contents of the valve pocket are thus consumed in the initial process of combustion and are ejected by their pressure into the mass of turbulent gas in the main chamber over the cylinder proper in a broad sheet of flame, igniting the whole with great rapidity. Whether or not the precise phenomena occurring are exactly those above described, it is obvious that the combustion chamber I have provided is adapted to promote the turbulence of the incoming mixture, and experimental tests have fully demonstrated that engines constructed according to my invention have better ignition, higher thermal efficiency, higher mean effective pressures, and greater freedom from preignition or other knocking, than those using the more usual shapes of combustion chamber.

Without further elaboration, the foregoing will so fully explain the gist of my invention that others may, by applying current knowledge, readily adapt the same to use under various conditions of service without eliminating certain essential features which may properly be said to constitute the primary items of novelty involved. It will, for instance, be obvious that the vortices of various shapes and lying in various planes, may readily be generated by changing the shape and size of the inlet passages and combustion chamber.

In Figures 6 and 7, I have illustrated a construction generally similar to those shown in the other figures, except that the cylinder head 28 extends downwardly as at 30 to meet lip 24, and cut off communication between the main combustion chamber and the space over the valve, across a trifle more than half of passage 13. In this construction, the incoming gases will be directed approximately along the path indicated by the arrow Y in Figure 7 and the resultant vortex will rotate about a vertical instead of a horizontal axis, or there may be an economical movement of the gas designed by combining the two movements, the one tending to have a horizontal and the other a vertical axis of rotation. The sub-joined claim is intended to define and secure to me the primary items of novelty involved in my invention.

I claim:

In an L-head internal combustion engine, a block having a cylinder and combustible gas inlet and burned gas outlet passages formed therein and terminating in triangular relation in the top of said block, a piston reciprocating in said cylinder and having its upper face concave, a head secured upon said block and having a circular concave recess registering over said cylinder and a side pocket with curved surfaces overlying said passages and communicating with said recess, valves for said passages, and ignition means located in said pocket.

In witness whereof, I hereunto subscribe my name this 14th day of April, 1921.

HARRY LE VAN HORNING.